United States Patent

Ando et al.

[11] Patent Number: 5,841,486
[45] Date of Patent: Nov. 24, 1998

[54] COMPENSATION VOLTAGE GENERATING APPARATUS FOR MULTIPICTURE DISPLAY AND VIDEO DISPLAY INCLUDING THE SAME

[75] Inventors: Hiroshi Ando; Atsuhisa Kageyama, both of Ibaraki, Japan

[73] Assignee: Matsushita Electric Industrial Co., Ltd., Osaka, Japan

[21] Appl. No.: 607,385

[22] Filed: Feb. 27, 1996

[30] Foreign Application Priority Data

Feb. 27, 1995 [JP] Japan ................................. 7-038327

[51] Int. Cl.⁶ ............................. H04N 5/45; H04N 5/57
[52] U.S. Cl. ........................... 348/673; 348/687; 348/565
[58] Field of Search .................... 348/673, 674, 348/687, 690, 568, 564, 563; H04N 5/45, 5/57

[56] References Cited

U.S. PATENT DOCUMENTS

| | | | |
|---|---|---|---|
| 3,947,631 | 3/1976 | Rhee | 348/673 |
| 4,044,375 | 8/1997 | Norman | 358/40 |
| 4,947,253 | 8/1990 | Neal . | |
| 5,003,394 | 3/1991 | Lagoni | 358/168 |
| 5,202,765 | 4/1993 | Lineberry . | |
| 5,204,748 | 4/1993 | Lagoni . | |
| 5,359,369 | 10/1994 | Izawa et al. . | |
| 5,396,300 | 3/1996 | Kageyama | 348/673 |
| 5,432,566 | 7/1995 | Tanaka et al. | 348/687 |
| 5,548,341 | 8/1996 | Klink et al. | 348/565 |
| 5,555,026 | 9/1996 | Lee | 348/565 |
| 5,596,374 | 1/1997 | Sumiyoshi et al. | 348/673 |
| 5,675,391 | 10/1997 | Yamaguchi et al. | 348/565 |
| 5,699,127 | 12/1997 | Ando et al. | 348/687 |

FOREIGN PATENT DOCUMENTS

| | | | |
|---|---|---|---|
| 0 443 064 | 8/1991 | European Pat. Off. . | |
| 0 675 644 | 10/1995 | European Pat. Off. . | |
| 60-172891 | 9/1985 | Japan . | |
| 63-121366 | 5/1988 | Japan . | |
| 403263984 | 11/1991 | Japan | H04N 5/45 |
| 5030442 | 2/1993 | Japan . | |
| 167946 | 7/1993 | Japan | H04N 5/45 |
| 5-167946 | 7/1993 | Japan . | |
| 406006710 | 1/1994 | Japan | H04N 5/45 |
| 6022238 | 1/1994 | Japan . | |
| 6098273 | 4/1994 | Japan . | |
| 7298096 | 11/1995 | Japan . | |

*Primary Examiner*—Glenton B. Burgess
*Attorney, Agent, or Firm*—Ratner & Prestia

[57] ABSTRACT

Average picture levels of a first video signal (for example, a parent picture signal) and a second video signal (for example, a child picture signal) are detected at first and second APL detection circuits, respectively. A compensation voltage sharing circuit inputs a compensation voltage, for example an ABL/ACL compensation voltage, and shares the compensation voltage according to a ratio of the APL values detected at the first and the second APL detection circuits. The shared compensation voltages are added to the first and the second video signals at the first and the second video processing circuits, respectively. The processed video signals are synthesized at a synthesizing circuit and the synthesized video signal is displayed on a screen of a display device as a multipicture, in which the first and the second pictures are independently and properly compensated by the ABL/ACL function. Thus, a good quality multipicture can be seen.

9 Claims, 7 Drawing Sheets

FIG. 1
PRIOR ART

A: COMPENSATION IS SMALL AND WHITE IS SUPPRESSED.
B: COMPENSATION IS LARGE AND DARK LEVEL SINKS TOO DEEPLY.

REAL LINE A: COMPENSATION CHARACTERISTIC FOR PICTURE A
BROKEN LINE B: COMPENSATION CHARACTERISTIC FOR PICTURE B

FIG. 2c

A: COMPENSATION IS SUFFICIENT AND WHITE IS NOT SUPPRESSED.
B: COMPENSATION IS SMALL AND DARK LEVEL SINKS ONLY A LITTLE.

COMPENSATION VOLTAGE GENERATING APPARATUS FOR MULTIPICTURE DISPLAY AND VIDEO DISPLAY INCLUDING THE SAME

BACKGROUND OF THE INVENTION

1. Field of the Invention

The present invention relates to a compensation voltage generating apparatus for multipicture display to simultaneously display a plurality of pictures on one display device and especially relates to a video display apparatus which displays a plurality of pictures on a display device at the same time. The present invention further relates to an automatic brightness limiter (ABL) and an automatic contrast limiter (ACL) of a luminance signal adjusting circuit which keeps the brightness of each picture constant and a gamma compensation circuit and a black stretch compensation circuit for a video signal, especially for use with a multipicture display television receiver.

2. Description of the Prior Art

The picture quality of television receivers is continuously sought to be improved and multipicture display apparatuses which simultaneously display a plurality of pictures on a cathode ray tube (CRT) are used in the market. In such a receiver, the CRT has a large screen and its extra high tension (EHT) circuit has a heavy load. Therefore, an ABL/ACL circuit is particularly necessary for automatically adjusting the blackest level and the amplitude of a brightness signal against EHT variation and for reducing a load in an EHT circuit.

In a two picture display, such as what is known as "picture in picture" or "parent and child picture", if automatic brightness/contrast limiting is executed for the entire screen, the brightness variation of the parent picture influences the child picture. That is, when the parent picture is bright, the ABL/ACL influences the child picture and the child picture gets too dark.

An ABL/ACL circuit to solve the above problem, for example, Japanese Patent Laid-Open No. 5-167946, has been proposed.

Figure 1:
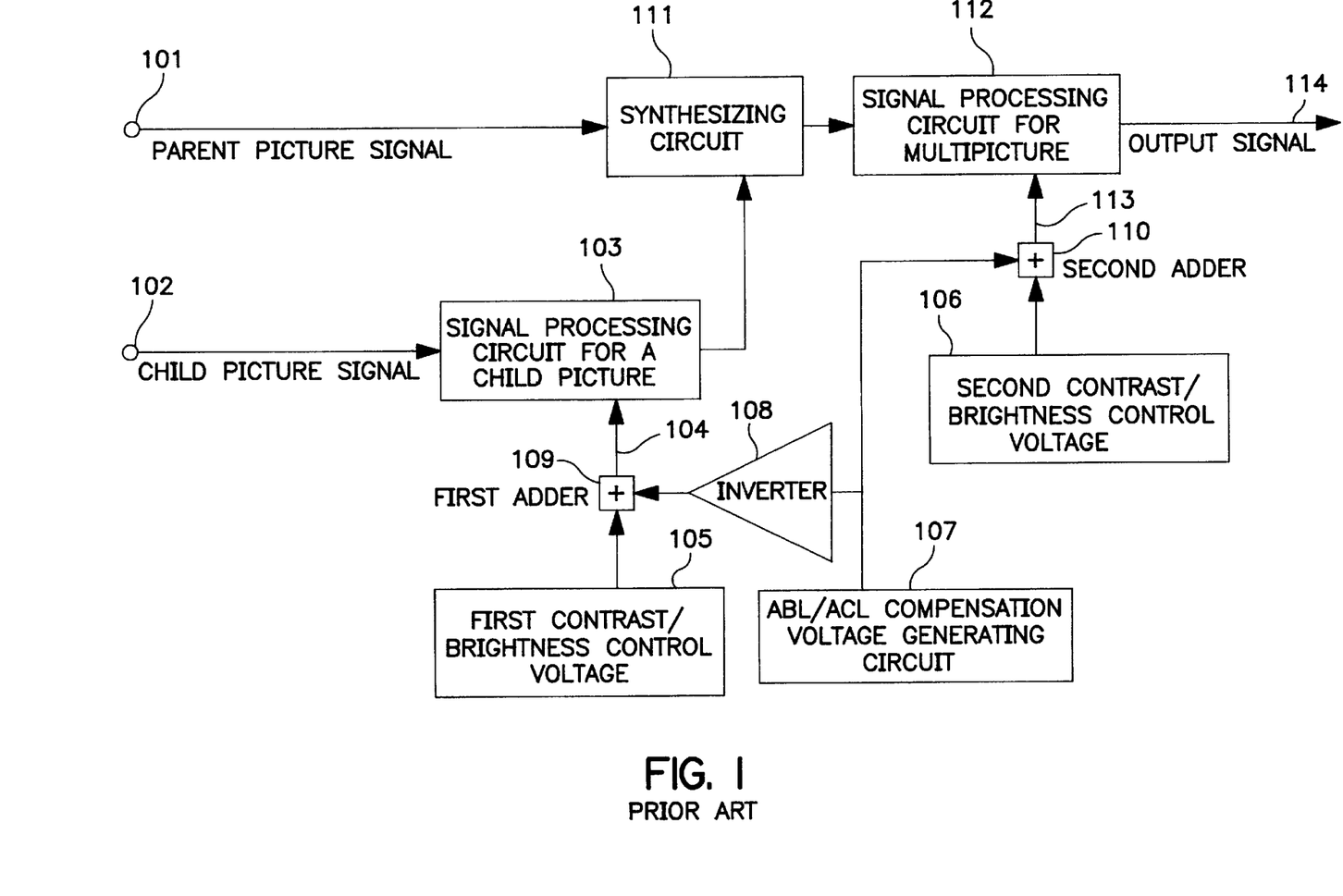
FIG. 1 is a block diagram of an ABL/ACL circuit in accordance with the prior art.

FIG. 1 is a block diagram of a signal processing circuit for a parent/child two picture display which compensates the picture, using an ABL/ACL circuit, having reverse characteristics between the parent picture and the child picture.

An ABL/ACL compensation signal coming from an ABL/ACL compensation voltage generating circuit 107 has its polarity reversed at an inverter 108 and is superimposed on a brightness/contrast adjusting voltage 105 at a first adder 109. A signal processing circuit for a child picture 103 is supplied with a child picture signal 102, adjusts a brightness/contrast of the child picture signal 102 by a signal from first adder 109 and at the same time compensates an ABL/ACL characteristic.

An ABL/ACL compensation signal coming from an ABL/ACL compensation voltage generating circuit 107 is sent to a second adder 110 without reversing its polarity and is superimposed on a brightness/contrast adjusting voltage 106 at second adder 110. A synthesizing circuit 111 synthesizes a parent picture signal 101 and a compensated child picture signal from signal processing circuit for a child picture 103. A signal processing circuit 112 adds a signal coming from second adder 110 onto a video signal in which the parent picture and the child picture are synthesized and received from synthesizing circuit 111 and outputs a parent/child two picture signal in which the brightness/contrast is adjusted and the ABL/ACL characteristic is compensated.

According to the above configuration, even if an ABL/ACL compensation voltage is applied from ABL/ACL voltage generating circuit 107 to the picture after two picture synthesis, because an inverse compensation voltage is applied to a signal processing circuit for a child picture 103 by inverter 108, an inverse ABL/ACL compensation is applied to the child picture and the brightness reduction of the child picture is reduced when the parent picture is bright and an ABL/ACL compensation is applied.

Figure 2A:
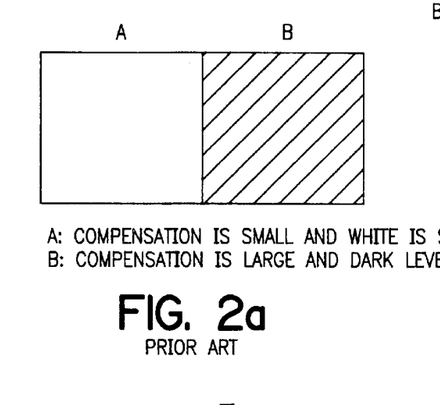
FIG. 2(a) illustrates a two picture display in accordance with the prior art.

In the above configuration in accordance with the prior art, however, there is no problem when the picture size and brightness do not greatly differ between the parent picture and the child picture. However, in the case in which the parent picture has nearly same size as the child picture and one of the pictures is bright and the other picture is dark as shown in FIG. 2(a), the ABL/ACL compensation voltage becomes a medium value.

As a result, sufficient compensation is not applied to the bright picture A which is necessary or white saturation or suppression occurs in picture A. On the other hand, too strong compensation is applied to the other picture B and the dark picture gets darker. Moreover, a stronger contrast causes a deflection width distortion due to EHT variation.

Figure 2B:
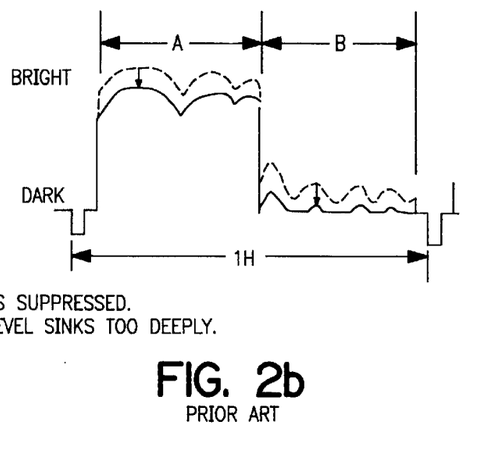
FIG. 2(b) is a brightness waveform of a two picture display video signal in accordance with the prior art.

This is also explained by the brightness waveform shown in FIG. 2(b). Because both the first picture A and the second picture B give the same amount of compensation, the first picture A, which is brighter, is compensated insufficiently and the white peak in the picture could saturate, and the second picture B, which is darker, is compensated excessively and the dark part in the picture becomes too dark, as indicated by the solid line. The broken line indicates a case in which compensation is not applied.

SUMMARY OF THE INVENTION

Considering the above problem, at a multipicture display, the present invention aims to obtain an optimum picture characteristic by sharing a compensation voltage of a picture quality compensation circuit such as ABL/ACL compensation, gamma compensation and black stretch compensation according to a ratio of average picture level (APL) of each picture comprising a multipicture and by compensating each picture according to the shared compensation voltages.

A multipicture compensation voltage generating apparatus in accordance with the present invention includes a plurality of APL detection circuits for detecting an APL value of each picture independently and a compensation voltage sharing circuit for varying the compensation degree according to the outputs of the APL detection circuits.

In such a configuration, it is possible to optimally control the picture of multipicture display according to the APL values of the individual pictures of the multipicture. That is, by detecting an APL value of each picture and sharing a compensation voltage according to the APL value of each compensating picture, an optimal performance to suppress white saturation and black sink of the picture minimum is obtained for each individual picture.

DETAILED DESCRIPTION OF THE INVENTION

Figure 3:
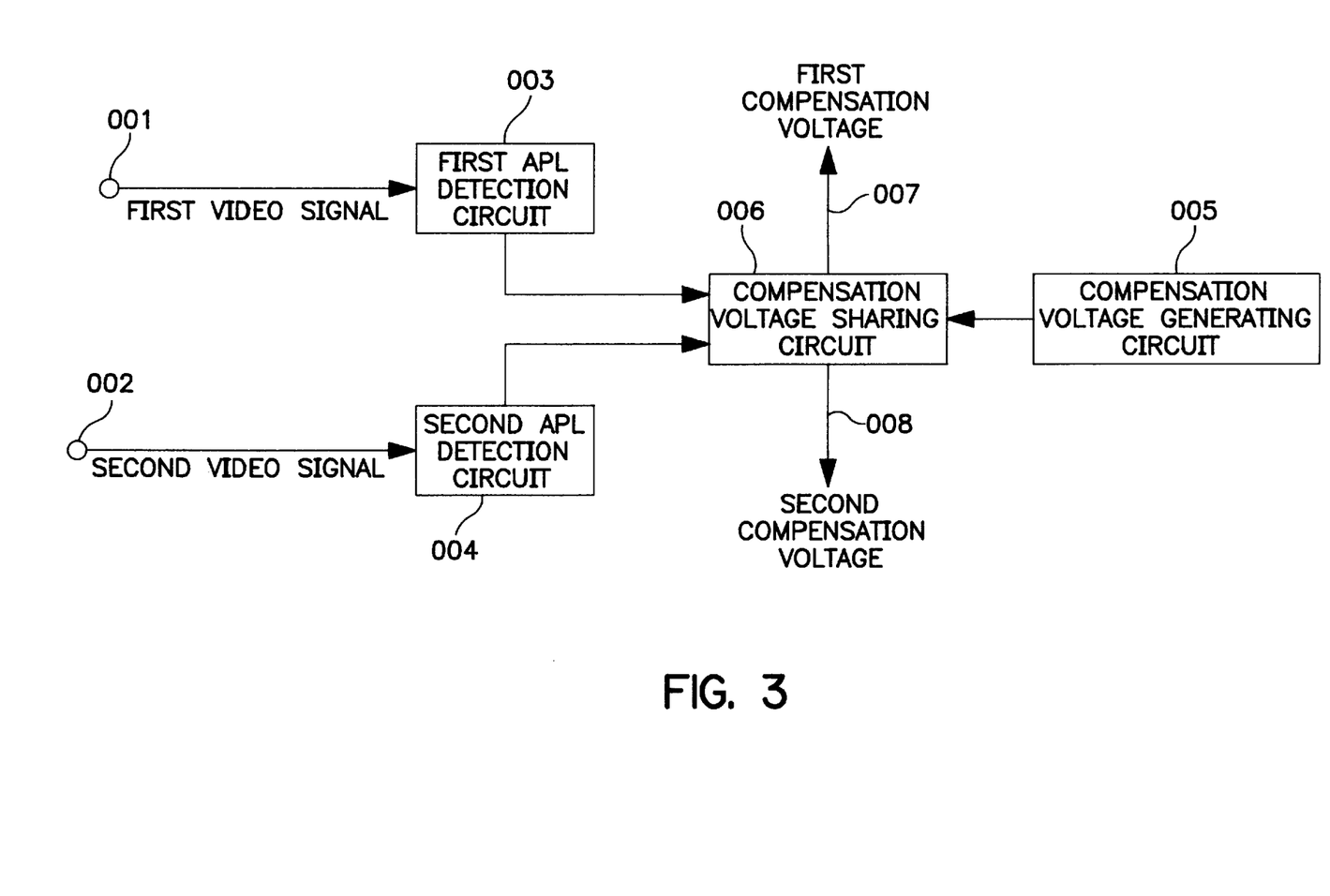
FIG. 3 is a block diagram of a multipicture compensation voltage generating circuit of an APL adaptive type in accordance with an exemplary embodiment of the present invention.

FIG. 3 is a block diagram of a multipicture compensation voltage generating circuit of an APL adaptive type in accordance with an exemplary embodiment of the present invention. Explanation is given for a two picture display for simplicity.

A first APL detection circuit 3 detects an APL of a first video signal (for example, a parent picture signal) 1 and a second APL detection circuit 4 detects an APL of a second video signal (for example, a child picture signal) 2. A compensation voltage generating circuit 5 generates a compensation voltage, for example, an ABL/ACL compensation voltage. A compensation voltage sharing circuit 6 shares the compensation voltage from compensation voltage generating circuit 5 according to the ratio of the APL values detected at first and second APL detection circuits 3 and 4, respectively, and outputs a first compensation voltage 7 and a second compensation voltage 8, respectively.

By such a configuration, the APL values of first video signal 1 and second video signal 2 are detected and the compensation voltage from compensation voltage generating circuit 5 can be shared at compensation voltage sharing circuit 6 according to the ratio of these detected APL values.

Figure 4:
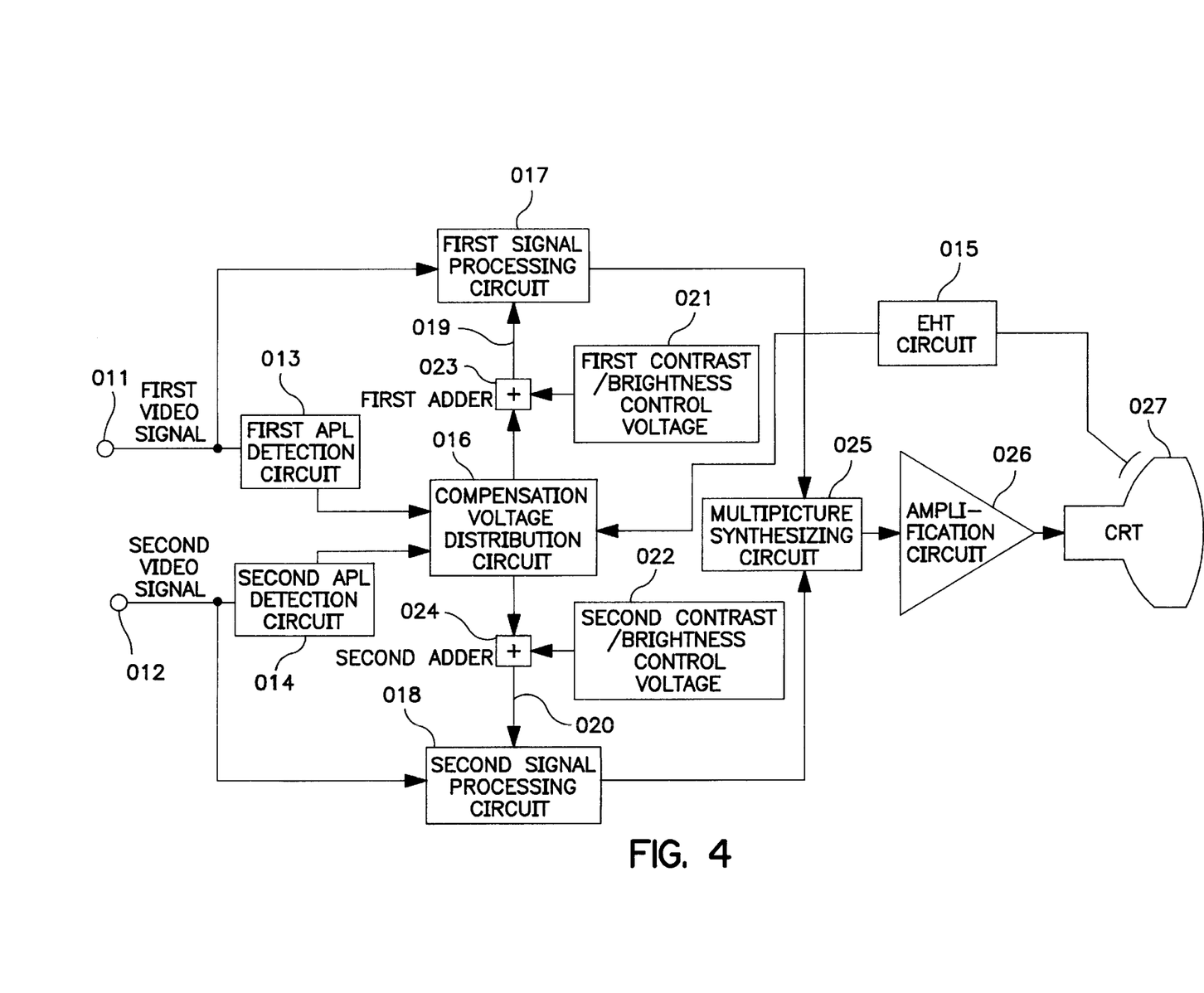
FIG. 4 is a block diagram of a video display apparatus using an ABL/ACL compensation circuit for a multipicture of an APL adaptive type in accordance with an exemplary embodiment of the present invention.

A case in which an exemplary embodiment of the present invention is applied to an ABL/ACL compensation circuit of an APL adaptive type is explained referring to FIG. 4. FIG. 4 is a block diagram of an ABL/ACL compensation circuit of an APL adaptive type.

A first APL detection circuit 13 detects an APL of a first video signal (for example, a parent picture signal) 11 and a second APL detection circuit 14 detects an APL of a second video signal (for example, a child picture signal) 12. An ABL/ACL compensation voltage is generated by an EHT circuit 15. A compensation voltage sharing circuit 16 shares the compensation voltage outputted from EHT circuit 15 according to the ratio of the APL values detected at first APL detection circuit 13 and second APL detection circuit 14 and outputs a first compensation voltage and a second compensation voltage.

A first adder 23 superimposes the first compensation voltage shared at compensation voltage sharing circuit 16 on a first brightness/contrast adjusting voltage 21 and outputs to a first signal processing circuit 17 a first brightness/contrast adjusting voltage 19 superimposed with first ABL/ACL compensation voltage. A second adder 24 superimposes the second compensation voltage shared at compensation voltage sharing circuit 16 on a second brightness/contrast adjusting voltage 22 and outputs to a second signal processing circuit 18 a second brightness/contrast adjusting voltage 20 superimposed with second ABL/ACL compensation voltage.

First signal processing circuit 17 controls first video signal 11 by superimposing first brightness/contrast adjusting voltage 19 with first ABL/ACL compensation voltage from first adder 23. Second signal processing circuit 20 controls second video signal 12 by superimposing second brightness/contrast adjusting voltage 20 with second ABL/ACL compensation voltage from second adder 24.

The video signal outputted from first signal processing circuit 17 and the video signal outputted from second signal processing circuit 18 are synthesized at a multipicture synthesizing circuit 25. The synthesized signal is amplified at a succeeding amplification circuit 26 and drives a CRT 27.

Thus, by detecting the APL values of first video signal 11 and second video signal 12, sharing the ABL/ACL compensation voltage supplied from EHT circuit 15 at compensation voltage sharing circuit 16 according to the ratio of the detected APL values, and supplying the shared ABL/ACL compensation voltages to first signal processing circuit 17 and second signal processing circuit 18, it is possible to give an optimal ABL/ACL compensation for each picture.

The performance of a video display apparatus using an ABL/ACL compensation circuit of an APL adaptive type configurated as shown in FIG. 4 is explained below referring to FIGS. 2(a)–2(e). In the prior art, even if one picture A is bright and the other picture B is dark as shown in FIG. 2(a), ABL/ACL compensation is given equally, that is, the compensation is insufficient for the brighter picture A and white saturation remains and on the other hand, the compensation is excessive for the darker picture B and the black level sinks too much.

Figure 2C:
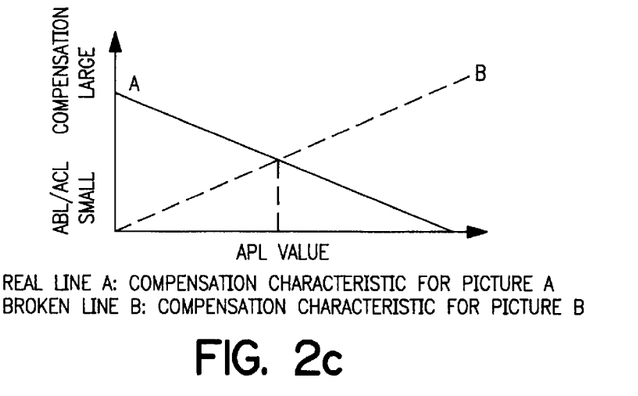
FIG. 2(c) is a sharing characteristic of ABL/ACL compensation voltages shared according to the ratio of the APL values of two pictures in accordance with an exemplary embodiment of the present invention.

Applying an exemplary embodiment of the present invention, the ABL/ACL compensation voltage supplied from the EHT circuit can be shared with the pictures A and B according to the ratio of the APL values of the pictures A and B as shown in the characteristic curves of FIG. 2(c).

Figure 2D:
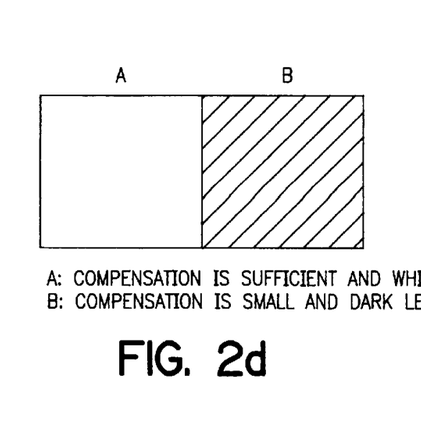
FIG. 2(d) illustrates a two picture display compensated by the circuit shown in FIG. 4.
Figure 2E:
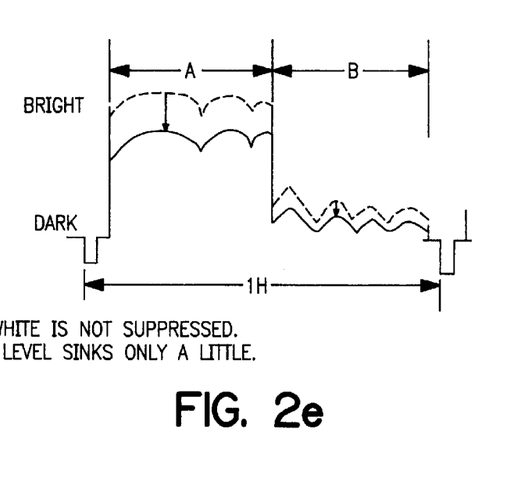
FIG. 2(e) is a brightness waveform of a two picture display video signal after compensation in accordance with an exemplary embodiment.

As a result, the ABL/ACL compensation voltage for each picture can be independently controlled and it is possible to reduce white saturation at a bright scene and black sink at a dark scene as shown in FIG. 2(d) and FIG. 2(e). In the brightness waveform of FIG. 2(e), the broken line indicates a state without compensation and the solid line indicates a state with compensation according to an exemplary embodiment of the present invention.

Figure 5:
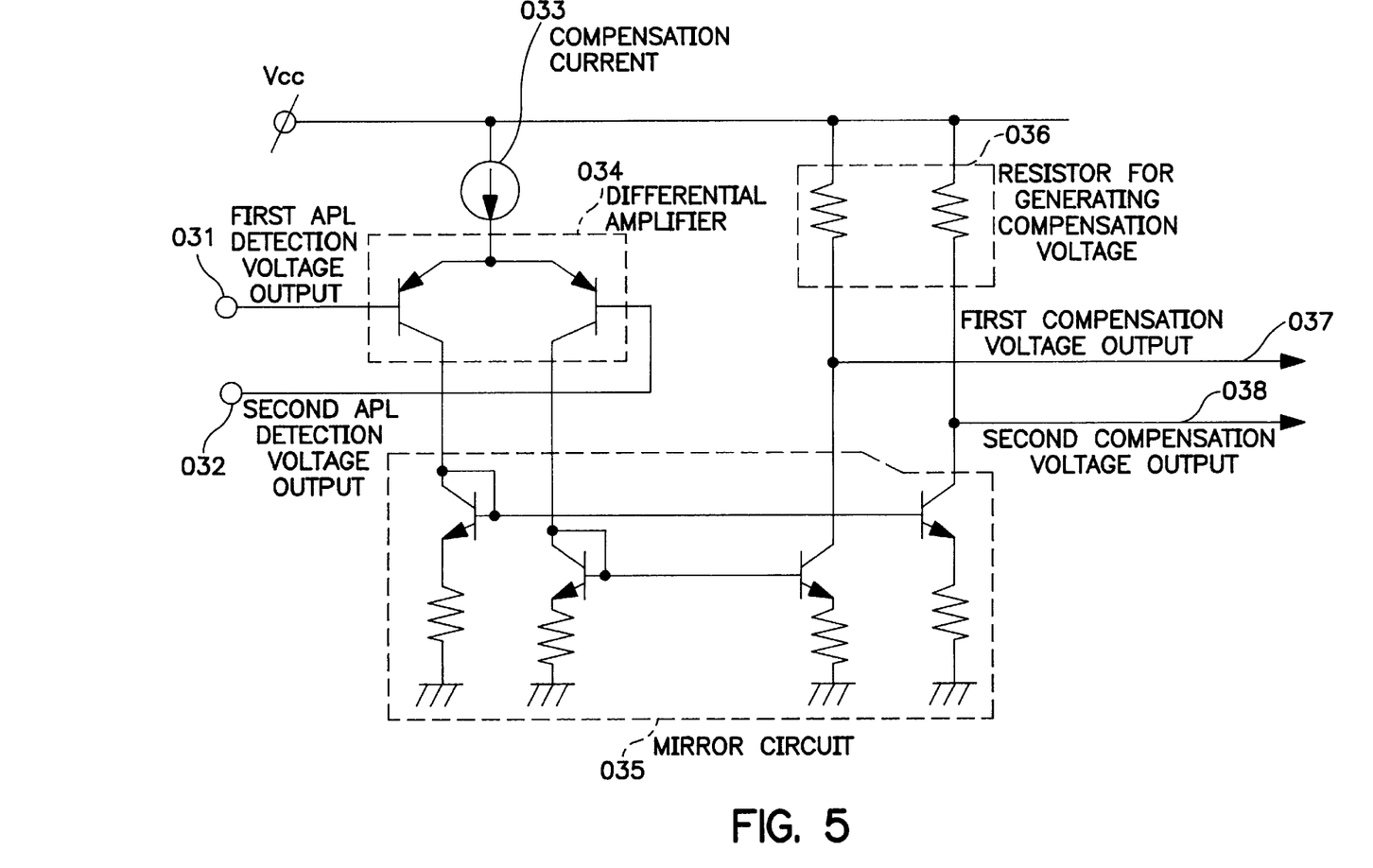
FIG. 5 is a block diagram of a compensation voltage sharing circuit used in a compensation voltage generating circuit for a multipicture of an APL adaptive type in accordance with an exemplary embodiment of the present invention.

An example of a multipicture compensation voltage generating circuit of an APL adaptive type shown in FIG. 3 is explained referring to FIG. 5.

APL detection voltages 31 and 32 of the first and the second pictures detected at first and second APL detection circuits 13 and 14 shown in FIG. 4 are inputted to two bases of a differential amplifier 34, respectively. A compensation current 33 such as an EHT circuit current for ABL/ACL compensation supplied from EHT circuit 15 of FIG. 4 is supplied to a common emitter of differential amplifier 34. The block 35 is a mirror circuit and first and second compensation voltages 37 and 38 are outputted from each of two collector resistors 36. First and second compensation voltages 37 and 38 are inputted to first and second adders 23 and 24, respectively, in FIG. 4.

When a compensation current 33 for EHT is supplied as a compensation current, APL detection voltages 31 and 32 are compared at differential amplifier 34, and the compensation currents are converted into voltages at resistors 36 for generating a compensation voltage after passing through mirror circuit 35. When first APL detection voltage 31 is larger than second APL detection voltage 32, first compensation voltage output 37 is larger than second compensation voltage output 38 and each picture has a different ABL/ACL characteristic.

Using such a configuration, it is possible to smoothly share a compensation voltage with each picture.

Figure 6:
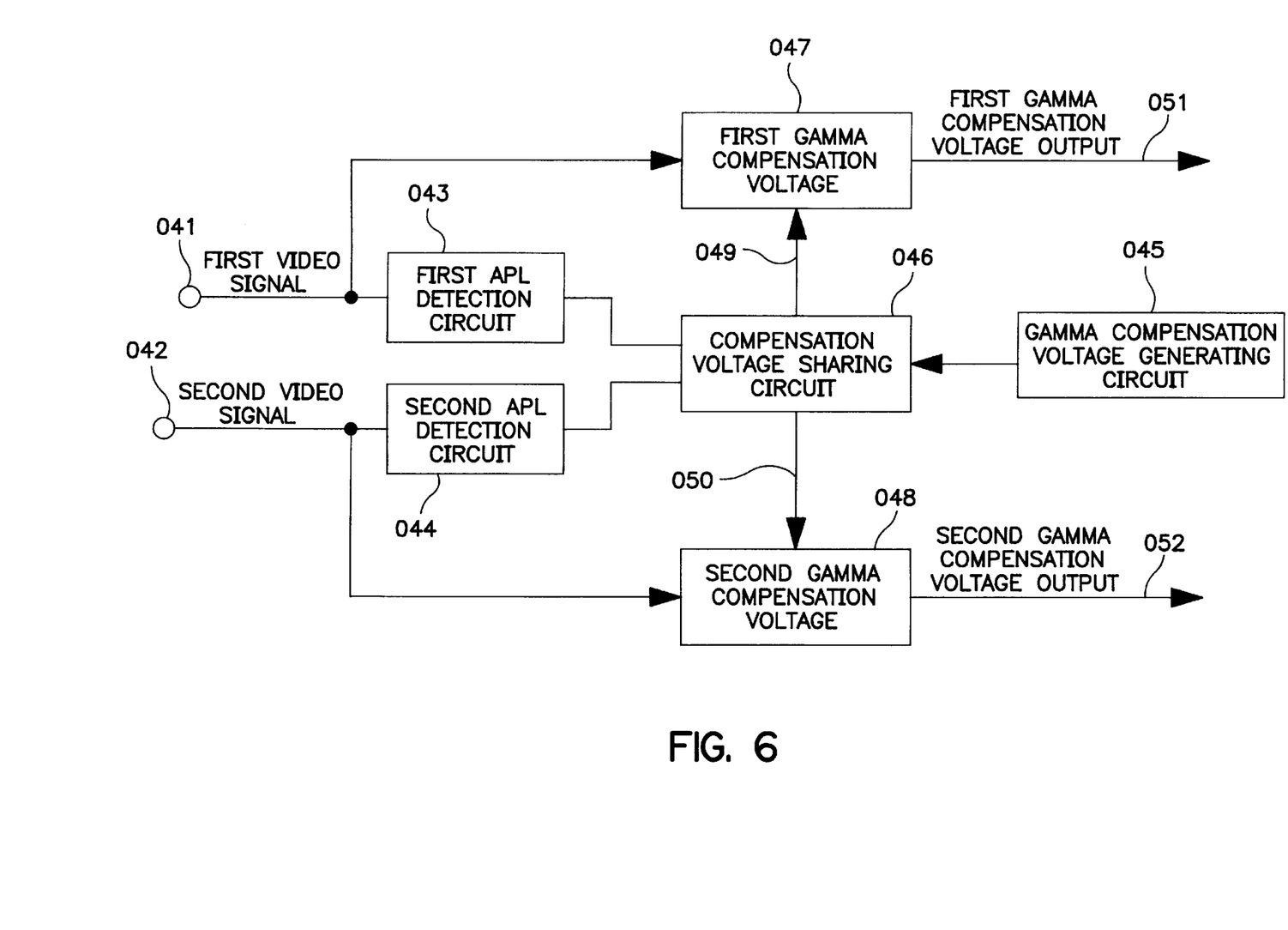
FIG. 6 is a block diagram of a gamma compensation circuit for a multipicture of an APL adaptive type in accordance with an exemplary embodiment of the present invention.

A case in which an exemplary embodiment of the present invention is applied to a gamma compensation circuit is explained referring to FIG. 6. FIG. 6 is a block diagram of a gamma compensation circuit used in a multipicture compensation voltage generating circuit in accordance with an exemplary embodiment of the present invention.

A first APL detection circuit 43 detects an APL of a first video signal (for example, a parent picture signal) 41 and a second APL detection circuit 44 detects an APL of a second video signal (for example, a child picture signal) 42. A compensation voltage sharing circuit 46 shares the gamma compensation voltage outputted from gamma compensation voltage generating circuit 45 according to the ratio of the APL values detected at first APL detection circuit 43 and second APL detection circuit 44 and the shared gamma compensation voltages are supplied to a first gamma compensation circuit 47 and a second gamma compensation circuit 48. First gamma compensation circuit 47 and second gamma compensation circuit 48 add the compensation voltages shared at compensation voltage sharing circuit 46 to first and second video signals 41 and 42 and output a gamma compensated video signal 51 for the first picture (parent picture) and a gamma compensated video signal 52 for the second picture (child picture), respectively.

The gamma compensated video signals of the first picture and the second picture are synthesized at multipicture synthesizing circuit 25 shown in FIG. 4. The synthesized video signal is supplied to CRT 27 after passing through amplification circuit 26 and is displayed on the screen of CRT 27 as a multipicture in which each picture is independently compensated.

According to such a configuration, it is possible to give an optimal picture quality compensation for each picture by detecting the APL values of first and second video signals 41 and 42 and sharing a gamma compensation voltage at compensation voltage sharing circuit 46 according to the ratio of the detected APL values, as well as ABL/ACL compensation.

Figure 7:
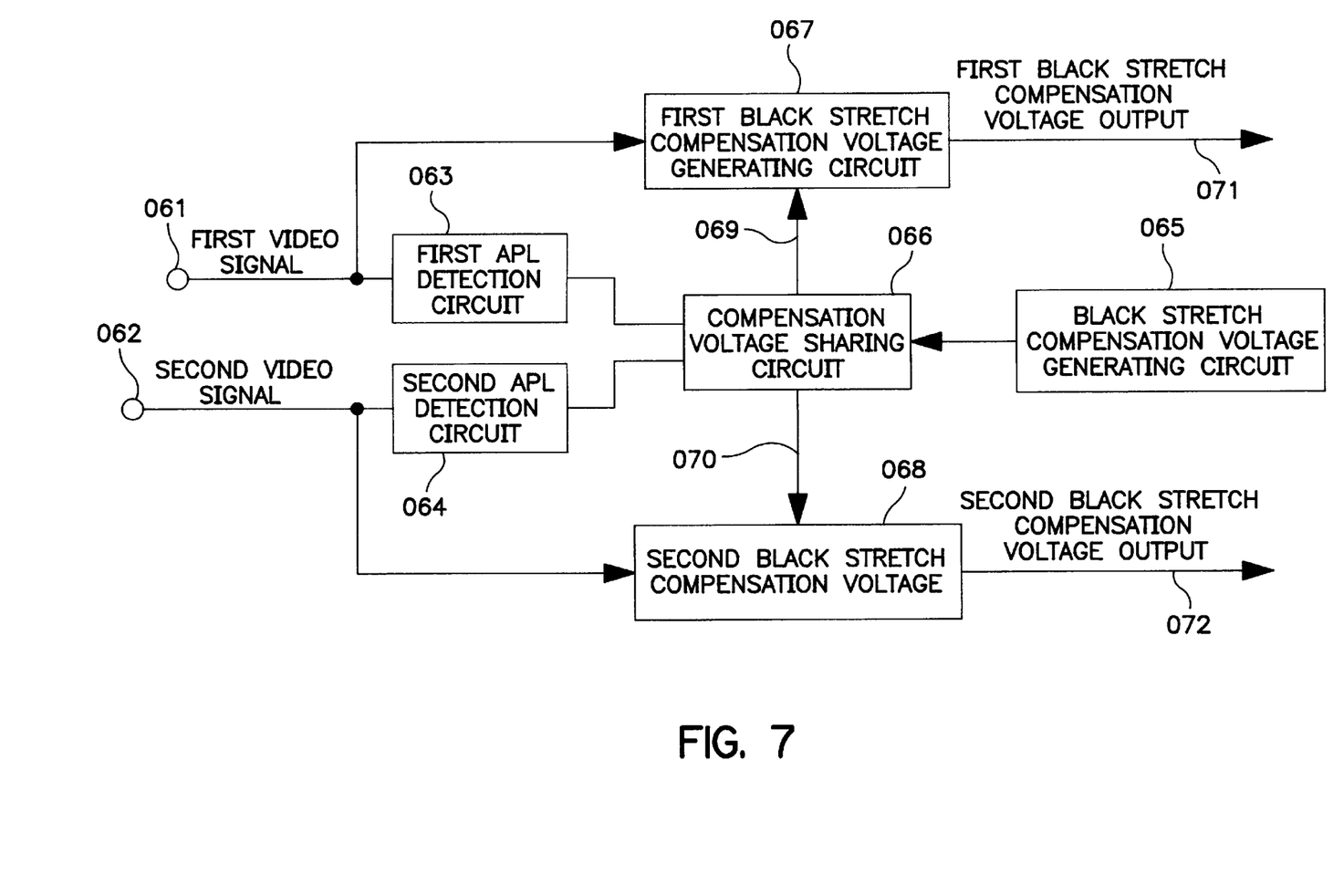
FIG. 7 is a block diagram of a black stretch compensation circuit for a multipicture of an APL adaptive type in accordance with an exemplary embodiment of the present invention.

A case in which an exemplary embodiment of the present invention is applied to a black stretch compensation circuit is explained referring to FIG. 7. FIG. 7 is a block diagram of a black stretch compensation circuit used in a multipicture compensation voltage generating circuit in accordance with an exemplary embodiment of the present invention.

A first APL detection circuit 63 detects an APL of a first video signal (for example, a parent picture signal) 61 and a second APL detection circuit 64 detects an APL of a second video signal (for example, a child picture signal) 62. A compensation voltage sharing circuit 66 shares a black stretch compensation voltage outputted from black stretch compensation voltage generating circuit 65 according to the ratio of the APL values detected at first APL detection circuit 63 and second APL detection circuit 64. The shared black stretch compensation voltages are supplied to a first black stretch compensation circuit 67 and a second black stretch compensation circuit 68. First black stretch compensation circuit 67 and second black stretch compensation circuit 68 add the compensation voltages shared at compensation voltage sharing circuit 66 to first and second video signals 61 and 62 and output a black stretch compensated video signal 71 for the first picture (parent picture) and a black stretch compensated video signal 72 for the second picture (child picture), respectively.

The black stretch compensated video signals of the first and the second pictures are synthesized at multipicture synthesizing circuit 25 shown in FIG. 4. The synthesized video signal is supplied to CRT 27 after passing through amplification circuit 26 and is displayed on the screen of CRT 27 as a multipicture in which each picture is independently compensated.

According to such a configuration, it is possible to give an optimal picture quality compensation for each picture by detecting the APL values of first and second video signals 61 and 62 and sharing a black stretch compensation voltage at compensation voltage sharing circuit 66 according to the ratio of the detected APL values, as well as ABL/ACL compensation and gamma compensation.

In the above described exemplary embodiments of the present invention, two picture displays are described as examples of multipicture display but it is obvious that the number of pictures displayed on a CRT at the same time is arbitrary. An optimal picture quality can be obtained by sharing the compensation even in the case of more than two pictures.

Thus, according to the exemplary embodiments of the present invention, an optimal compensation characteristic such as ABL/ACL compensation is obtained for each picture comprised in a multipicture by a configuration including a plurality of APL detection circuits for detecting APL values of pictures comprised in a multipicture and a compensation voltage sharing circuit for sharing a compensation voltage according to the ratio of the detected APL values.

Although it is described that compensations for ABL/ACL, gamma and black level are made separately, all ABL/ACL compensation, gamma compensation and black level compensation can be made by using each APL detection circuit in common and cascade connecting a signal processing circuit for ABL/ACL compensation, a first gamma compensation circuit and a first black level compensation circuit among each of the first and second groups. Of course, two or three kinds of compensations can be combined.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A compensation voltage generating apparatus for multipicture display comprising:

compensation voltage generation means for generating a picture quality compensation amount for each picture in a multipicture video signal to simultaneously display a plurality of pictures on a picture display device;

a plurality of average picture level detection means for detecting an average picture level for each of said pictures; and compensation voltage sharing means for sharing the picture quality compensation amount of each picture to said multipicture video signal, according to each respective average picture level of said pictures detected at said plurality of average picture level detection means.

2. A compensation voltage generating apparatus for multipicture display as recited in claim 1, wherein:

said compensation voltage sharing means shares a plurality of compensation currents; each respective one of said plurality of compensation currents corresponding to each respective average picture level of said pictures using a differential amplifier and generating a compensation voltage for each of said pictures.

3. A compensation voltage generating apparatus for multipicture display as recited in claim 1, wherein:

the picture quality compensation amount of said compensation voltage generation means is a compensation amount of automatic brightness limiter which automatically controls a black level of said multipicture video signal and a compensation amount of automatic contrast limiter which automatically controls the amplitude of said multipicture video signal so that the beam current is smaller than a predetermined value.

4. A compensation voltage generating apparatus for multipicture display as recited in claim 1, wherein:

the picture quality compensation amount of said compensation voltage generation means is a gamma compensation amount to compensate gamma of said video signal.

5. A compensation voltage generating apparatus for multipicture display as recited in claim 1, wherein:

the picture quality compensation amount of said compensation voltage generation means is a black stretch compensation amount to compensate black stretch of said video signal.

6. A video display apparatus comprising:

a cathode ray tube for displaying a plurality of pictures of a multipicture video signal;

drive means for driving said cathode ray tube according to said multipicture video signal;

deflection means for deflecting an electron beam in order to display said plurality of pictures by said electron beam of said cathode ray tube driven by said drive means;

extra high tension generating means for supplying an extra high tension to accelerate said electron beam to said cathode ray tube and generating a detection voltage for automatic brightness limiting compensation and automatic contrast limiting compensation; and a compensation voltage generating apparatus comprising:
compensation voltage generating means for generating a picture quality compensation value for all pictures in said multipicture video signal to simultaneously display said plurality of pictures on said cathode ray tube;

a plurality of average picture level detection means for detecting a respective plurality of average picture levels from said plurality of pictures; and compensation voltage sharing means responsive to the plurality of average picture levels for sharing the picture quality compensation value of said compensation generating means among a respective plurality of picture quality compensation values, one for each of the plurality of pictures in said multipicture video signal.

7. A video display apparatus comprising:

a cathode ray tube for displaying a plurality of pictures of a multipicture video signal;

drive means for driving said cathode ray tube according to said multipicture video signal;

deflection means for deflecting an electron beam in order to display said plurality of pictures by said electron beam of said cathode ray tube driven by said drive means;

extra high tension generating means for supplying an extra high tension to accelerate said electron beam to said cathode ray tube and generating a detection voltage for automatic brightness limiting compensation and automatic contrast limiting compensation;

an automatic contrast limiter which automatically controls an amplitude of said multipicture video signal so that a beam current of said electron beam is smaller than a predetermined value, automatic contrast limiter having a first compensation value;

an automatic brightness limiter which automatically controls a black level of said multipicture video signal, said automatic brightness limiter having a second compensation value of; and a compensation voltage generating apparatus comprising:
compensation voltage generating means for generating a picture quality compensation value for all pictures in said multipicture video signal to simultaneously display said plurality of pictures on said cathode ray tube;

a plurality of average picture level detection means for detecting an average picture level for each of said plurality of pictures; and compensation voltage sharing means responsive to the plurality of average picture levels for sharing the picture quality compensation value of said compensation generating means among a respective plurality of picture quality compensation values, one for each of the plurality of pictures in said multipicture video signal;

wherein the picture quality compensation value of said compensation voltage generation means is said first compensation value of said automatic contrast limiter and said second compensation value of said automatic brightness limiter.

8. A video display apparatus comprising:

a cathode ray tube for displaying a plurality of pictures of a multipicture video signal;

drive means for driving said cathode ray tube according to said multipicture video signal;

deflection means for deflecting an electron beam in order to display said plurality of pictures by said electron beam of said cathode ray tube driven by said drive means;

extra high tension generation means for supplying an extra high tension to accelerate said electron beam to said cathode ray tube and generating a gamma compensation voltage;

gamma compensation means for performing gamma compensation for adequately displaying said multipicture video signal on said cathode ray tube; and compensation voltage generation means for generating a picture quality compensation amount for each picture in said multipicture video signal to simultaneously display said plurality of pictures on a picture display device, wherein:

the picture quality compensation amount of said compensation voltage generation means is a gamma compensation amount to compensate gamma of said video signal.

9. A video display apparatus comprising:

a cathode ray tube for displaying a plurality of pictures of a multipicture video signal;

drive means for driving said cathode ray tube according to said multipicture video signal;

deflection means for deflecting an electron beam in order to display said plurality of pictures by said electron beam of said cathode ray tube driven by said drive means;

extra high tension generation means for supplying an extra high tension to accelerate said electron beam to said cathode ray tube and generating a black stretch compensation voltage;

black stretch compensation means for performing black stretch compensation for adequately displaying said multipicture video signal on said cathode ray tube; and compensation voltage generation means for generating a picture quality compensation amount for each picture in said multipicture video signal to simultaneously display said plurality of pictures on a picture display device, wherein:

the picture quality compensation amount of said compensation voltage generation means is a black stretch compensation amount to compensate black stretch of said video signal.

* * * * *